June 15, 1954  A. C. SMART  2,680,935
FIGURE FORMING FOLDABLE SHEET
Filed Sept. 21, 1951
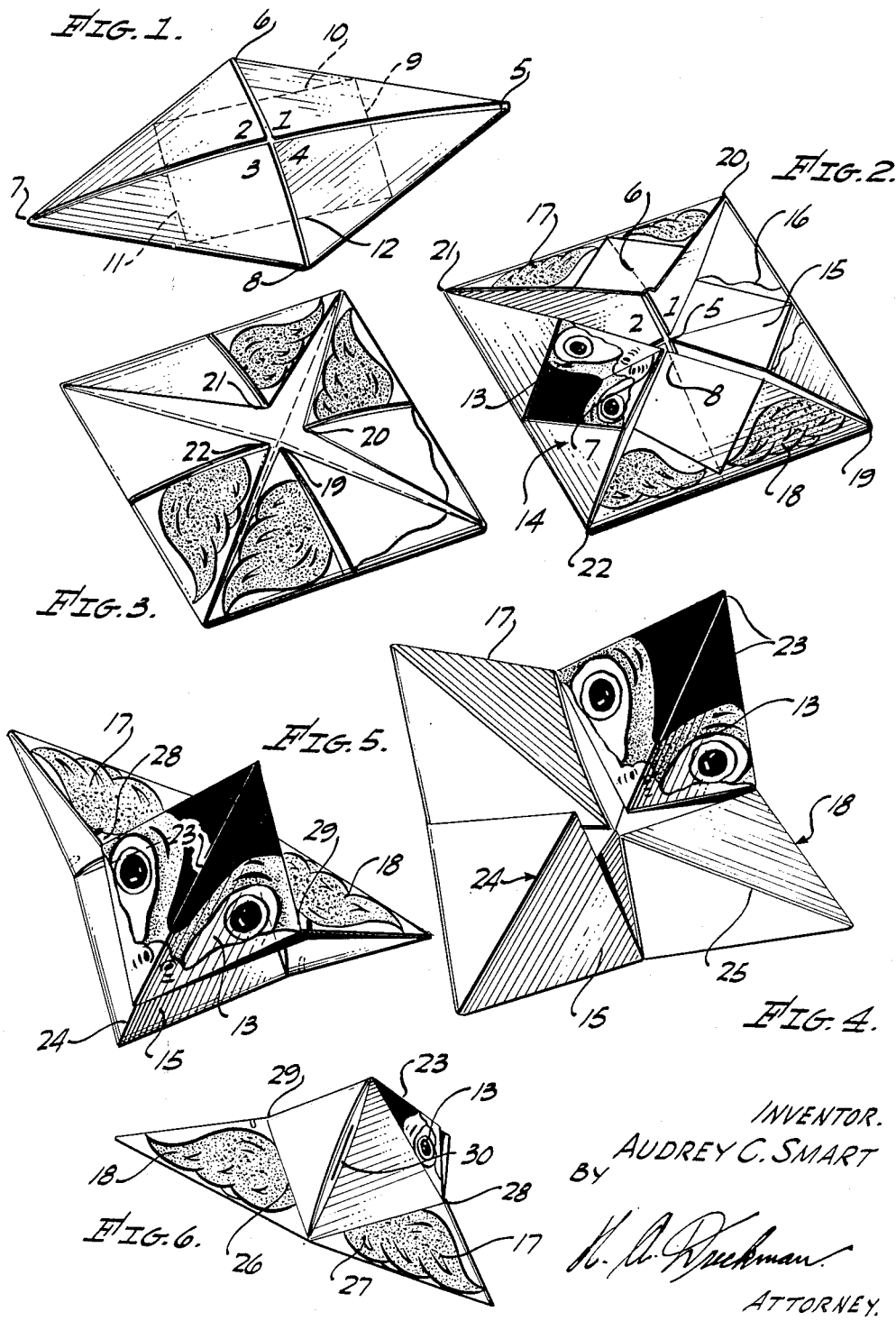
INVENTOR.
AUDREY C. SMART
BY
ATTORNEY.

Patented June 15, 1954

2,680,935

UNITED STATES PATENT OFFICE 2,680,935

FIGURE FORMING FOLDABLE SHEET

Audrey C. Smart, El Paso, Tex.

Application September 21, 1951, Serial No. 247,679

2 Claims. (Cl. 46—124)

This invention relates to a method of folding a sheet of paper so as to form a figure, such as a simulated bird or animal.

An object of my invention is to provide a method of folding a sheet of paper so as to form an enclosure in the shape of a simulated bird or animal enclosure serving as a receptacle for coins, namely, a small bank.

Another object of my invention is to provide a novel method of folding a sheet of paper so as to form a simulated bird or animal in which the sheet of paper is first received flat and is then folded by the recipient so as to form the complete enclosed bank or receptacle, thus adding interest to its formation and causing amusement for children.

Another object of my invention is to provide a novel foldable sheet of the character stated, which is simple in construction, inexpensive to manufacture and which is amusing to form into its final shape.

Other objects, advantages and features of invention may appear from the accompanying drawing, the subjoined detailed description and the appended claims.

In the drawing

Figure 1 is a perspective view of a sheet of paper in which the first folds have been completed to form the sheet into a square.

Figure 2 is a perspective view of the sheet at the completion of the second folds, again forming a rectangular structure.

Figure 3 is a perspective view of the foldable sheet showing the reverse side to Figure 2 and with the edges folded inwardly to again form a third square.

Figure 4 is a perspective view of the paper sheet, with the head and tongue portions so folded that they may be inserted one in the other.

Figure 5 is a perspective view of the sheet formed as a receptacle and about to be creased in final position as a bank.

Figure 6 is a perspective view of the rear of the assembled figure shown in Figure 5.

Referring more particularly to the drawing, occasionally it might be necessary to make a foldable sheet from a very light weight paper and in order that the final figure may be stapled I start with a square sheet of paper approximately fifteen inches square, more or less, and fold the four corners 1, 2, 3 and 4 to the center, as shown in Figure 1. If the paper stock is heavy, then this first fold can be eliminated and the initial square of paper is approximately eleven inches, more or less, square.

The square shown in Figure 1 is now folded in the following manner:

The corners 5, 6, 7 and 8 are folded to the center along the dotted lines 9, 10, 11 and 12, thus forming a simulated square, as shown in Figure 2.

A bird or animal's head 13 is drawn on the triangular panel 14. A bright colored tongue 15 is drawn on the triangular panel 16, which is opposite the panel 14. The panels 17 and 18 have wings drawn thereon or other figures of a bird or animal. The folded square shown in Figure 2 is now turned over and the four corners 19, 20, 21 and 22 are folded inwardly to form a still smaller square shown in Figure 3.

The sheet is now ready to be folded to form the completed figure. The square shown in Figure 3 is now turned over thus placing the head 13 and the tongue 15 on top. The head 13 is creased along the line 23 and is pulled outwardly to form a pyramid. The tongue 15 is also creased along the line 24 and this tongue portion is also pulled upwardly for a purpose to be subsequently described.

The square is also creased diagonally along the line 25, that is, across the wing structure 17 and 18. Next, fold along the line 25, as well as along the lines 26 and 27, thus forming a pyramid with a face 13 on two sides of this pyramid. The tongue 15 is now pushed upwardly into the head 13 so that the inner point of the tongue is at the apex of the pyramid forming a head. This forms the structure shown in Figure 5.

By squeezing inwardly at the edges 28 and 29, the mouth of the bird or animal opens thus simulating opening and closing of the mouth.

To act as an enclosure, paper clips are attached at 28 and 29, thus securing the folded wings 17 and 18 together at their forward edges and providing a complete enclosure for the reception of coins. A coin slot 30 is cut in the back of the head pyramid, through which coins are inserted into the pyramid receptacle.

Having described my invention, I claim:

1. A figure formed of a foldable sheet consisting of a rectangular sheet of material, the four corners of said sheet being first folded inwardly to the center forming a second rectangle of smaller dimensions, then folding the four corners of the second rectangle sheet inwardly to the center forming a third rectangle of still smaller dimensions, then folding the four corners of the third rectangle backwardly to the center of the third rectangle forming a fourth rectangle of still smaller dimensions, then folding the third rectangle sheet diagonally, one of the second named folds being lifted outwardly and creased to form a pyramid, another of the second named folds being lifted upwardly and creased to fit into the first creased fold, said creased folds being fitted one within the other to form a hollow pyramid closed on all sides, and wing folds projecting outwardly from said pyramid.

2. A figure formed of a foldable sheet consisting of a rectangular sheet of material, the four corners of said sheet being first folded inwardly to the center forming a second rectangle of smaller dimensions, then folding the four corners of the second rectangle sheet inwardly to the center forming a third rectangle of still smaller dimensions, then folding the four corners of the third rectangle backwardly to the center of the third rectangle forming a fourth rectangle of still smaller dimensions, then folding the third rectangle sheet diagonally, one of the second named folds being lifted outwardly and creased to form a pyramid, another of the second named folds being lifted upwardly and creased to fit into the first creased fold, said creased folds being fitted one within the other to form a hollow pyramid closed on all sides, and wing folds projecting outwardly from said enclosure, and means securing one edge of said wing folds together whereby a completely assembled figure is formed.

References Cited in the file of this patent

UNITED STATES PATENTS

| Number | Name | Date |
|---|---|---|
| 502,896 | Vine | Aug. 8, 1893 |
| 859,280 | Berg et al. | July 9, 1907 |
| 2,096,130 | Phillips | Oct. 19, 1937 |